United States Patent Office
2,829,121
Patented Apr. 1, 1958

2,829,121

INCREASING EFFECTIVENESS OF PHENOLIC ANTIOXIDANTS

Harold M. Leeper, Charleston, W. Va., assignor to Monsanto Chemical Company, St. Louis, Mo., a corporation of Delaware No Drawing. Application July 14, 1955
Serial No. 522,155

16 Claims. (Cl. 260—45.9)

The present invention relates to improvements in rubber compounding and is particularly directed to the problem of preventing discoloration and degradation of natural and synthetic rubbers.

A general object of the invention is to inhibit the aging and discoloration of sulfur vulcanizable rubbers. A further object is to increase the effectiveness of certain phenolic antioxidants. A particular object is to provide combinations of dihydric phenol antioxidants and amines which exert a synergistic effect. Another particular object is to increase the age resistance of rubber stocks containing dihydric phenol antioxidants. Still other objects are to decrease the discoloration of rubber by dihydric phenol antioxidants and to provide anti-degradant compositions which do not discolor rubber. A further object is to provide compositions which economically inhibit degradation.

Deterioration of rubber due to aging is a well defined problem. The degradation is manifested in the case of natural rubber by loss of tensile strength and it is usually attributed to absorption of oxygen. It has long been known that such deterioration can be greatly retarded by treating the rubber before or after vulcanization with substances known as age resisters or antioxidants. The age resisting characteristics of a vulcanized rubber product can be readily ascertained by subjecting samples of the vulcanized rubber to the action of air or oxygen at elevated temperatures.

Certain phenols are commonly used for preserving rubber and others have been disclosed in the chemical and patent literature. Phenolic antioxidants containing two phenolic hydroxy groups in a single molecule are valuable for use in the manufacture of white rubber goods because they are efficient preservatives and discolor much less than aromatic amine anti-oxidants. Nevertheless, complete absence of discoloration is seldom attained and phenolic antioxidants are generally weaker age resisters than aromatic amines. However, it has now been discovered that treating rubber with a phenolic antioxidant containing two phenolic hydroxy groups in conjunction with an aliphatic amine or mixed aliphatic-aromatic monoamine, either as free amine or in the form of a salt, achieves advantages unobtainable with either ingredient alone. The addition of the amine reduces discoloration by the phenolic antioxidant and increases the age resistance.

The amines suitable for practicing the invention include common aliphatic mono- and polyamines whether primary, secondary, tertiary or mixtures thereof, and simple mixed aliphatic-aromatic monoamines. The organic substituent on the nitrogen will usually be a hydrocarbon radical but substitution is permissible, notably by cyano, halogen, hydroxy, keto, and lower alkoxy groups. Aliphatic groups include benzyl which is predominately aliphatic in properties, saturated bivalent radicals attached to a central nitrogen atom to complete a saturated heterocyclic ring and alicyclic as well as saturated and unsaturated open carbon chain radicals. Addition of the amine in the form of a salt is usually preferred and has the advantage of lowering volatility.

A combination of dicyclohexylamine and a dihydric phenol antioxidant provides an outstanding non discoloring anti-oxidant composition. Salts of dicyclohexylamine have been studied extensively and found to be generally effective. Fatty acid salts are fully equivalent to the free amine if added to provide an equivalent amine content. The preferred salts are the stearate, acetate, oleate, adipate, oxalate, formate, nitrite, toluenesulfonate and dodecylbenzenesulfonate. Less desirable are the benzoate, salicylate and phthalate.

Examples of other aliphatic amines suitable for use in practicing the invention comprise: cyclohexylamine stearate, N-methylcyclohexylamine, N-methylcyclohexylamine, acetate, N-methylcyclohexylamine stearate, N-2-cyanoethylcyclohexylamine, N-2-chloroallylcyclohexylamine, N-(3-chloro-2-butenyl)cyclohexylamine, N-nonenylcyclohexylamine, N-dodecenylcyclohexylamine, N'-dodecylcyclohexylamine, N-methyldicyclohexylamine, N-methyldicyclohexylamine formate, N-methyldicyclohexylamine stearate, 2-dicyclohexylaminoethanol, dicyclohexylamino-2-propane, N-butyldicyclohexylamine, N,N-dimethylcyclohexylamine, N,N-dimethylcyclohexylamine stearate, dibutylamine, dibutylamine oleate, diamylamine, dioctylamine, diethanolamine, morpholine, morpholine stearate, N-2-cyanoethylbutylamine, diethylenetriamine and triethylenetetramine.

The mixed aliphatic-aromatic amines contemplated contain in addition to an aliphatic substituent which is preferably one or more cyclohexyl groups, one monovalent aromatic substituent attached to nitrogen. By monovalent is meant that the aromatic group is linked to the residue of the molecule containing the amino substituent by a single valence and is linked to only one amino substituent. Examples of mixed amines which have been tested and found suitable for practicing the invention comprise: N-cyclohexylaniline, N-cyclohexyl-p-phentidine, N-cyclohexyl-o-hydroxyaniline, N-2-cyanoethylaniline, N-2-cyanoethyl-p-toluidine, N-2-cyanoethyl-p-amylaniline, N-ethyl-p-phenetidine, N-benzyl-p-phenetidine, N-2-cyanoethyl-p-phenetidine, N-2-cyanoethyl-o-phenetidine, N-allyl-p-phenetidine, N,N-diethyl-p-phenetidine and N,N-dimethylaniline stearate.

Examples of typical phenolic antioxidants used to advantage in conjunction with an amine comprise: 2,2'-methylenebis-6-tert. butyl p-cresol, 4,4'-thiobis(6-tert. octyl m-cresol), 4,4'-ethylidenebis(6-tert. butyl m-cresol) and 4,4'-heptylidenebis(6-tert. butyl m-cresol).

Specific embodiments of the invention which illustrate the increased resistance to discoloration were prepared from the following base formulation:

| | Parts by weight |
|---|---|
| Pale crepe rubber | 100.0 |
| Zinc oxide | 25.0 |
| Titanium dioxide | 50.0 |
| Clay | 15.0 |
| Sulfur | 3.0 |
| Stearic acid | 1.0 |
| Benzothiazolyl disulfide | 0.6 |
| Diphenyl guanidine | 0.15 |

Using this base formula, stocks were compounded by adding the ingredients recorded in Table I, and the stocks vulcanized in the usual manner. Samples of the cured specimens were evaluated for reistance to discoloration by exposing them to ultra violet light radiation from an S-1 sunlamp for ten days. The color of the specimens before and after exposure was evaluated by means of a photovolt reflectance meter calibrated against standard magnesium oxide as 100% reflectance. The percentage of the original reflectivity retained after exposure was calculated and is recorded in Table I. Note that dicyclohexylamine stabilizes the color of rubber as well as reduces discoloration by the phenolic antioxidant.

Table I

| Stock | 1 | 2 | 3 | 4 | 5 | 6 |
|---|---|---|---|---|---|---|
| 4,4'-Thiobis (6-tert. butyl m-cresol) parts by weight | | 2.0 | 1.6 | 1.2 | 0.8 | 0.4 |
| Dicyclohexylamine stearate parts by weight | | | 0.4 | 0.8 | 1.2 | 1.6 |
| Percent Reflectivity retained after exposure parts by weight | 86 | 48 | 71 | 82 | 84 | 91 |

Further specific embodiments of the invention which illustrate the increased resistance to aging were prepared from the following base formulation:

| | Parts by weight |
|---|---|
| Smoked sheets | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| Cyclohexyl 2-benzothiazolesulfenamide | 0.5 |

Stocks compounded from this base were vulcanized by heating in a press and the optimum cures artificially aged by heating in a circulating air oven at 100° C. The tensile strength after aging was determined as well as the tensile strength of the unaged stocks and the percentage retained after aging calculated. In some cases additional tests were conducted by measuring the time at 100° C. within which the vulcanizates relaxed under constant load. In this test, known as the continuous creep test, the time required for the sample to double in length was recorded. For a description of the apparatus and procedure see M. C. Throdahl, "Aging of Elastomers. Comparison of Creep with Some Conventional Aging Methods," Industrial and Engineering Chemistry, vol. 40, p. 2180, November 1948. The materials added to the base stock and the corresponding physical properties of the vulcanizates are summarized in the tables below:

Table II

| Stock | 7 | 8 | 9 | 10 | 11 | 12 |
|---|---|---|---|---|---|---|
| 4,4'-Thiobis (6-tert. butyl m-cresol) parts by weight | | 1.0 | 0.8 | 0.6 | 0.4 | 0.2 |
| Dicyclohexylamine acetate parts by weight | 1.0 | | 0.2 | 0.4 | 0.6 | 0.8 |
| Percent Tensile Strength Retained After Aging 48 hrs. parts by weight | 41 | 49 | 50 | 58 | 71 | 56 |
| Creep, hrs. parts by weight | 40 | 64 | 68 | 68 | 68 | 64 |

Table III

| Stock | 13 | 14 | 15 | 16 | 17 |
|---|---|---|---|---|---|
| 4,4'-Butylidenebis (6-tert. butyl m-cresol) parts by weight | 1.0 | 0.8 | 0.6 | 0.4 | 0.2 |
| Dicyclohexylamine acetate parts by weight | | 0.2 | 0.4 | 0.6 | 0.8 |
| Percent Tensile Strength Retained After aging 48 hrs. parts by weight | 39 | 59 | 51 | 48 | 40 |
| Creep, hrs. parts by weight | 49 | 60 | 64 | 64 | 53 |

Table IV

| Stock | 18 | 19 | 20 | 21 |
|---|---|---|---|---|
| 2,5-Di-tert. amylhydroquinone parts by weight | | 1.0 | 0.8 | 0.2 |
| Dicyclohexylamine acetate parts by weight | 1.0 | | 0.2 | 0.8 |
| Percent Tensile Strength Retained After Aging 48 hrs. parts by weight | 53 | 42 | 58 | 57 |

It will be appreciated that the phenolic antioxidant and amine may be admixed before addition to the rubber. The amounts will vary depending upon the particular rubber composition and the results desired. Usually the proportion of phenolic antioxidant will be 10%–90% and the amine 90%–10%. Of course, the amount of the admixture added to the rubber can also vary but 0.5–5% based on the rubber will suffice for most purposes. The phenolic antioxidant separately or after pre-mixing may be added to rubber by Banbury mixing or milling, by addition to rubber latex or by application to the surface of crude or vulcanized rubber.

While the invention has been illustrated by compositions in which elemental sulfur was the vulcanizing agent, other vulcanizing systems are applicable, as for example N,N'-dithioamines. N,N'-dithiobis morpholine is a satisfactory vulcanizing agent. Any sulfur vulcanizing agent is suitable whether in the form of elemental sulfur or selenium or a sulfur compound which releases sulfur at vulcanizing temperature. The sulfur level can be varied to achieve particular advantages. For example even better aging stocks result from reducing the sulfur. About 1.4 parts is optimum for GR–S and about 1.0% is optimum for natural rubber. Similarly, other sulfur vulcanizable rubbers may be used in the practice of the invention. These include homopolymers and copolymers of diene hydrocarbons. A variety of sulfur vulcanizable diene hydrocarbon rubbers are known, several of which have achieved commercial importance and may be used to advantage in practice of the invention.

It is intended to cover all changes and modifications of the examples of the invention herein chosen for purpoess of disclosure which do not constitute departures from the spirit and scope of the invention.

What is claimed is:

1. A sulfur vulcanizable diene hydrocarbon rubber composition having incorporated therein a small amount each of a phenolic antioxidant containing two phenolic hydroxy groups selected from the class consisting of alkylidene bis dialkylphenols, thiobis dialkylphenols and dialkylhydroquinone and a substituted ammonia compound selected from the class consisting of amines and salts thereof, the amine being selected from a class consisting of saturated heterocyclic amines, ethylene polyamines and monoamines having attached to the nitrogen at least one non-aromatic organic radical but not more than one aromatic radical, the radicals linked to nitrogen being selected from a group consisting of hydrogen, cyclohexyl, alkyl, cyanoethyl, hydroxyethyl, acetonyl, benzyl, alkenyl, chloroalkenyl, phenyl, hydroxyphenyl, lower alkoxy phenyl and lower alkyl phenyl radicals, the proportion of phenolic antioxidant being within the range of 10–90% and the proportion of substituted ammonia compound being within the range of 90–10% of the combined weight and the combined weight being within the range of 0.5–5% of the rubber hydrocarbon.

2. A sulfur vulcanizable diene hydrocarbon rubber composition having incorporated therein a small amount each of a thiobis (dialkylphenol) and a fatty acid salt of dicyclohexylamine, the proportion of phenolic antioxidant being within the range of 10–90% and the proportion of salt being within the range of 90–10% of the combined weight, the combined weight being within the range of 0.5–5% of the rubber hydrocarbon.

3. A sulfur vulcanizable diene hydrocarbon rubber composition having incorporated therein a small amount each of a dialkylhydroquinone antioxidant and dicyclohexylamine the proportion of dialkylhydroquinone being within the range of 10–90% and the proportion of dicyclohexylamine being within the range of 90–10% of the combined weight, the combined weight being within the range of 0.5–5% of the rubber hydrocarbon.

4. A sulfur vulcanizable diene hydrocarbon rubber composition having incorporated therein a small amount each of an alkylidene bis dialkyl phenol antioxidant containing two phenolic hydroxy groups and a fatty acid salt of dicyclohexylamine the proportion of phenolic antioxidant being within the range of 10–90% and the proportion of salt being within the range of 90–10% of the combined weight, the combined weight being within the range of 0.5–5% of the rubber hydrocarbon.

5. A sulfur vulcanizable diene hydrocarbon rubber composition having incorporated therein a small amount each of 4,4'-thiobis(6-tert. butyl m-cresol) and dicyclohexylamine the proportion of bis cresol being within the range of 10–90% and the proportion of dicyclohexylamine being within the range of 90–10% of the combined weight, the combined weight being within the range of 0.5–5% of the rubber hydrocarbon.

6. A sulfur vulcanizable diene hydrocarbon rubber composition having incorporated therein a small amount each of 4,4'-butylidenebis(6-tert. butyl m-cresol) and dicyclohexylamine the proportion of bis cresol being within the range of 10–90% and the proportion of dicyclohexylamine being within the range of 90–10% of the combined weight, the combined weight being within the range of 0.5–5% of the rubber hydrocarbon.

7. Vulcanized diene hydrocarbon rubber having incorporated therein a small amount each of a phenolic antioxidant containing two phenolic hydroxy groups selected from the class consisting of alkylidene bis dialkylphenols, thiobis dialkylphenols and dialkylhydroquinone and a substituted ammonia compound selected from the class consisting of amines and salts thereof, the amine being selected from a class consisting of saturated heterocyclic amines, ethylene polyamines and monoamines having attached to the nitrogen at least one non-aromatic organic radical but not more than one aromatic radical, the radicals linked to nitrogen being selected from a group consisting of hydrogen, cyclohexyl, alkyl, cyanoethyl, hydroxyethyl, acetonyl, benzyl, alkenyl, chloroalkenyl, phenyl, hydroxyphenyl, lower alkoxy phenyl and lower alkyl phenyl radicals, the proportion of phenolic antioxidant being within the range of 10–90% and the proportion of substituted ammonia compound being within the range of 90–10% of the combined weight and the combined weight being within the range of 0.5–5% of the rubber hydrocarbon.

8. Vulcanized diene hydrocarbon rubber having incorporated therein a small amount each of a thiobis(dialkylphenol) antioxidant and a fatty acid salt of dicyclohexylamine, the proportion of phenolic antioxidant being within the range of 10–90% and the proportion of salt being within the range of 90–10% of the combined weight, the combined weight being within the range of 0.5–5% of the rubber hydrocarbon.

9. Vulcanized diene hydrocarbon rubber having incorporated therein a small amount each of a dialkylhydroquinone antioxidant and dicyclohexylamine the proportion of dialkylhydroquinone being within the range of 10–90% and the proportion of dicyclohexylamine being within the range of 90–10% of the combined weight, the combined weight being within the range of 0.5–5% of the rubber hydrocarbon.

10. Vulcanized diene hydrocarbon rubber having incorporated therein a small amount each of an alkylidene bis dialkyl phenol antioxidant containing two phenolic hydroxy groups and a fatty acid salt of dicyclohexylamine the proportion of phenolic antioxidant being within the range of 10–90% and the proportion of salt being within the range of 90–10% of the combined weight, the combined weight being within the range of 0.5–5% of the rubber hydrocarbon.

11. Vulcanized diene hydrocarbon rubber having incorporated therein a small amount of each of 4,4'-thiobis(6-tert. butyl m-cresol) and dicyclohexylamine the proportion of bis cresol being within the range of 10–90% and the proportion of dicyclohexylamine being within the range of 90–10% of the combined weight, the combined weight being within the range of 0.5–5% of the rubber hydrocarbon.

12. Vulcanized diene hydrocarbon rubber having incorporated therein a small amount each of 4,4'-butylidenebis-(6-tert. butyl m-cresol) and dicyclohexylamine the proportion of bis cresol being within the range of 10–90% and the proportion of dicyclohexylamine being within the range of 90–10% of the combined weight, the combined weight being within the range of 0.5–5% of the rubber hydrocarbon.

13. A composition comprising 10%–90% of a substituted ammonia compound selected from the class consisting of amines and salts thereof, the amine being selected from a class consisting of saturated heterocyclic amines, ethylene polyamines and monoamines having attached to the nitrogen at least one non-aromatic organic radical but not more than one aromatic radical, the radicals linked to nitrogen being selected from a group consisting of hydrogen, cyclohexyl, alkyl, cyanoethyl, hydroxyethyl, acetonyl, benzyl, alkenyl, chloroalkenyl, phenyl, hydroxyphenyl, lower alkoxy phenyl and lower alkyl phenyl radicals and 90%–10% of a phenolic antioxidant containing two phenolic hydroxy groups selected from the class consisting of alkylidene bis dialkyl phenols, thiobis dialkyl phenols and dialkylhydroquinone.

14. A composition comprising 10%–90% of a fatty acid salt of dicyclohexylamine and 90%–10% of a thiobis-(dialkylphenol) antioxidant.

15. A composition comprising 10%–90% of a fatty acid salt of dicyclohexylamine and 90%–10% of 4,4'-thiobis(6-tert. butyl m-cresol).

16. A composition comprising 10%–90% of a fatty acid salt of dicyclohexylamine and 90%–10% of 4,4'-butylidenebis(6-tert. butyl m-cresol).

References Cited in the file of this patent

UNITED STATES PATENTS

| | | |
|---|---|---|
| 2,514,363 | Barnes et al. | June 11, 1950 |
| 2,538,355 | Davis et al. | Jan. 16, 1951 |
| 2,605,249 | Albert | July 29, 1952 |
| 2,645,674 | Kinney | July 14, 1953 |

FOREIGN PATENTS

| | | |
|---|---|---|
| 712,447 | Great Britain | July 21, 1954 |